Jan. 17, 1967  L. ELSBETT  3,298,332
INTERNAL COMBUSTION ENGINE SUPERCHARGING
Filed July 20, 1964

INVENTOR
Ludwig Elsbett
BY Bailey, Stephens and Huettig
ATTORNEYS

3,298,332
INTERNAL COMBUSTION ENGINE SUPERCHARGING
Ludwig Elsbett, Nurnberg, Germany, assignor to Maschinenfabrik Augsburg-Nurnberg AG, Nurnberg, Germany
Filed July 20, 1964, Ser. No. 383,886
Claims priority, application Germany, July 23, 1963, M 57,593
3 Claims. (Cl. 123—52)

This invention is directed to a multi-cylinder internal combustion piston engine and, in particular, to a four-cycle engine in which the periods for the intake gas inlet to the cylinder and the exhaust gas outlet from the cylinder overlap in order to influence the effect of the last of the intake air and/or the exhaust gas in the intake and exhaust systems.

In diesel engines especially, it is desired to supply as much intake air as possible in the engine cylinder for each piston cycle in the simplest possible manner for obtaining good combustion of the fuel. Under certain circumstances, it is possible to do without mechanical supercharger which consumes energy from the engine. Also, in order to produce a proper fuel combustion in a fuel injection engine, it is of advantage to give the intake combustion air an unidirectional swirl around the longitudinal axis of the cylinder. This is done by using a curved intake air channel or by using a masked valve. This swirling intake air must flow as smoothly and undisturbed as possible so that the injected fuel can vaporize and mix with the air.

In order to increase the volume of air drawn into the cylinder during the piston suction stroke, it has been suggested, among other things, that a length of pipe be inserted into the intake pipe of the cylinder. However, such a pipe cannot be long enough to avoid noisy vibrations in the column of intake air insofar as a vehicle engine is concerned because of the changing engine speeds which must be used. According to this invention, it is proposed that a length of intake air pipe can be used, which pipe has a diameter to length ratio of about 1 to 10 without adversely affecting the resonance in the column of intake air in the pipe.

My copending application Serial No. 258,499, filed February 14, 1963, for Engine Supercharging, now Patent No. 3,146,764, discloses that, in a four-cycle internal combustion engine having the customary intake valve open crankshaft angle of from 220 to 240°, it is best to provide a common intake air pipe for three cylinders which fire in direct succession and which cylinders have a combined crankshaft angle of 720°. Consequently, in a six-cylinder engine which has the firing order of 1, 5, 3, 6, 2, 4. cylinders 1, 2 and 3 are grouped with a common intake manifold and cylinders 4, 5 and 6 are grouped with another manifold. Each group of cylinders provides the desired effect upon the intake air in its respective manifold.

Thus, in the described intake air system, a considerable improvement in the volumetric efficiency is obtained by using the dynamic forces in the column of intake air being drawn into the cylinders since the column of air put in motion by the piston suction stroke is forced into the cylinders by the energy produced by each of the three pistons in the group of cylinders and the weight of the air in each cylinder is increased. The additional air provided each cylinder increases in proportion to the increase in energy given the column of air during the first part of each piston suction stroke.

In this invention, the energy in the column of intake air is increased both by the suction of the piston at the beginning of the suction stroke and by the energy in the column of exhaust gas leaving the cylinder.

In this invention, when the exhaust valve opens for the exhaust cycle, the escaping column of exhaust gas leaving the cylinder draws fresh intake air in its wake from the intake pipe through the cylinder and into the exhaust pipe. The exhaust valve remains open until a successive cylinder connected to a common exhaust manifold has its exhaust valve opened and produces a reversing movement to the air in the exhaust pipe by means of the exhaust pressure wave.

A further feature of this invention lies in that only two cylinders of the multi-cylinder engine have a common exhaust pipe and which cylinders have an ignition time separated by a crankshaft angle of 360°. Accordingly, the pressure wave in this common exhaust pipe occurs 360° after the exhaust valve opening or about 40 to 50° of crankshaft angle before upper dead center. Thus the exhaust valve, according to this invention, is opened at least 130° crankshaft angle into the intake air suction cycle. During this time, additional intake air is drawn into the exhaust pipe from the intake air pipe through the cylinder. This forms a suction which increases the velocity of the air flowing through the intake pipe and which, in turn, increases the pressure of the air in the cylinder and the volumetric efficiency in the cylinder by reason of this after-loading effect.

Also, in this invention, it is possible to push back into the cylinder the portion of fresh air which has entered the exhaust pipe because the exhaust valve remains open until its companion cylinder has started in its exhaust cycle. In this case, the air column in the exhaust pipe is put in motion back into the cylinder by the exhaust pressure wave of the companion cylinder and therefore a further improvement in the volumetric efficiency is obtained.

Another feature of this invention improves the swirling flow in the intake air pipe by reason of the increase in velocity given the intake air suction stroke and which is highly desirable for certain methods of fuel combustion. When the exhaust pressure wave of the succeeding companion cylinder is used to improve the combustion air load in the cylinder, then the exhaust pipe can be shaped to produce the desired direction of air swirl.

The increased air movement in the cylinder and intake and exhaust pipes also produces an improved scavenging of the cylinder, cooling of the valves, and so forth. In engines where the temperature of the combustion air is very important, this invention presents an improvement inasmuch as the air is forced from the exhaust pipe back into the cylinder at a higher temperature.

A corresponding selection of the overlapping closing time of the exhaust valve, together with the exhaust gas pressure wave of the companion cylinder, enables the amount of intake air in the cylinder to be increased with a decreasing engine speed. This is more satisfactory for vehicle engines than supercharging the engine with turbine-driven blowers. Nevertheless, according to this invention, it is possible to use a turbine-driven blower in connection with the exhaust gas and in which only the two cylinders separated by a crankshaft angle of 360° may be combined. This means that an exhaust gas turbine in a four-cycle engine is charged by two pipes, in a six-cylinder engine by three pipes, and in an eight-cylinder engine by four pipes.

In order to draw fresh intake air into the exhaust pipe, the exhaust valve can remain open at the upper dead center point or close only as much as required for the free travel of the piston. The control and/or overlap of the intake and/or exhaust periods is done by correspondingly shaped valve cams.

The length of the pipe which is connected to the intake for the combined three cylinders depends, as mentioned before, upon the combined energy given by the suction pull of the piston and the effect of the suction produced by the column of exhaust gas. According to this invention, the pipes can have a diameter to length ratio of 1 to 15. When the suction effect of the exhaust gas is used, the engine can be operated with a diameter to length ratio of 1 to 14 without the inherent frequency of the pulsating air column being noticeable. The frequency of the pulsating air column is also not noticeable as it is always suppressed by the respective momentary suction energy. It is only when the engine is mounted for stationary operation at a constant speed that it is possible to extend the pipes so that the air load into the cylinder is additionally increased by the vibrations of the air column in the intake pipe.

On the exhaust side of the engine, the exhaust pipe for two connected cylinders preferably has a diameter to length ratio of about 1 to 30.

The means by which the objects of the invention are obtained are described more fully with reference to the accompanying drawings representing a six-cylinder in line engine and in which.

Figure 1:
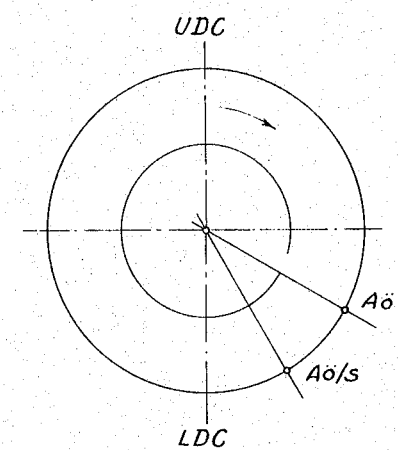
FIGURE 1 is a diagram of the control time for the exhaust valve.

As shown in FIGURE 1, the exhaust valve closes only after the exhaust valve opens in the companion cylinder which is separated by 360° and by reason of which a back-pressure is produced in the exhaust gas column as heretofore described.

Figure 2:
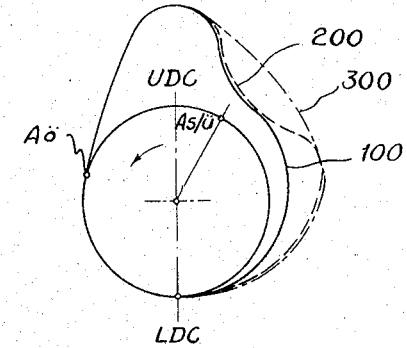
FIGURE 2 is a front view of three representative types of exhaust valve control cams.

In FIGURE 2, the cams 100, 200 and 300 close the exhaust valve almost up to its customary closure point $As/ü$. The exhaust valve opens at the point $Aö$. However, the exhaust valve is not kept completely closed but it is again opened over a few degrees as indicated by the shape of the curve on cam 100 and is then completely closed at $Aö/s$ and thus the exhaust opening extends into the intake air phase. The dashed line of cam 200 indicates that the exhaust valve is again opened after the piston has passed upper dead center. Cam 300 represents the ideal case where the exhaust valve remains open at upper dead center. This is in a construction in which the piston will not strike the opened exhaust valve.

Figure 3:
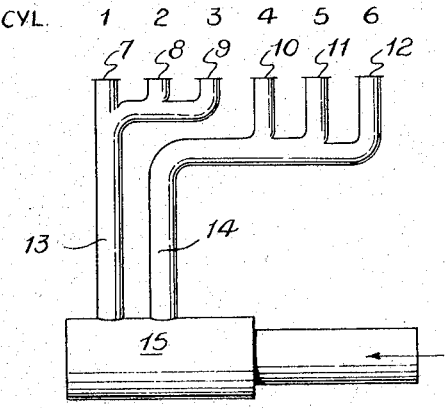
FIGURE 3 is a view of the intake air pipe arrangement.

An intake air pipe arrangement is shown in FIGURE 3 for a six-cylinder engine. Cylinders 1 to 6 have intake air pipes 7 to 12, respectively. Intake air pipes 7, 8 and 9 have a common intake air pipe 13, while intake air pipes 10, 11 and 12 are connected to a common intake air pipe 14. Pipes 13 and 14 are connected to the main air intake line 15. The cylinders are fired in the order of 1, 5, 3, 6, 2, 4. In this invention, the length L of intake air pipe 13 begins at its juncture with its three cylinders and ends at pressure equalizer 15 which serves to prevent vibrations in the pipes.

Figure 4:
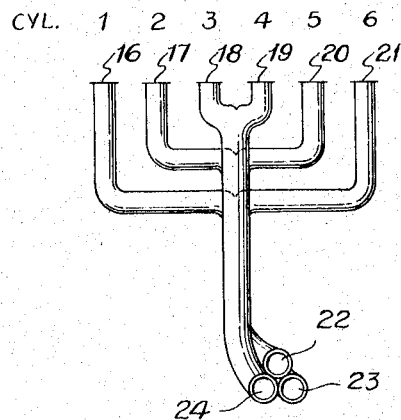
FIGURE 4 is a similar view of the exhaust gas pipe arrangement.

The exhaust pipe arrangement in FIGURE 4 is used together with the intake air pipe arrangement of FIGURE 3. In FIGURE 4, the exhaust pipes 16 and 21 for cylinders 1 and 6, respectively, are connected to a common exhaust pipe 22. Likewise, exhaust pipes 17 and 20 are joined to a common exhaust pipe 23 and the exhaust pipes 18 and 19 to a common exhaust pipe 24. The effective length L, according to this invention, extends from the juncture of the exhaust pipes for two cylinders up to a muffler serving as an equalizing chamber.

In this invention, it is emphasized that the air pushed back into the cylinder from the exhaust pipe is at a higher than ordinary temperature which makes it easier to ignite the fuel being used in the engine.

Having now described the means by which the objects of the invention are obtained, I claim:

1. In a four-cycle multi-cylinder internal combustion piston engine in which the mass effect of the intake air in one engine cylinder is increased by the overlapping of the intake air and exhaust gas changeover periods in the cylinder, the improvement comprising an air intake pipe common to each three cylinders having intake valve opening times separated by a crankshaft angle of 240°, and an exhaust gas pipe common to each two cylinders having exhaust valve opening times separated by a crankshaft angle of 360°, said overlapping of the intake air and exhaust gas changeover periods in each one of said two cylinders of said four cycle engine being such that the intake air is drawn through said one of said two cylinders and into said exhaust pipe, and the exhaust valve opening times for the said two cylinders being overlapping for forcing the air back into said one of said two cylinders by the exhaust gas pressure of the other cylinder, one of said each two cylinders being connected to one of said intake pipes and the other of said each two cylinders being connected to another of said intake pipes.

2. In an engine as in claim 1, further comprising means in said exhaust pipe for giving a unidirectional swirl to the air forced back into the cylinder.

3. In an engine as in claim 2, said intake pipe having a diameter to length ratio of about from 1 to 14 to 1 to 15, and said exhaust pipe having a diameter to length ratio of about 1 to 30.

References Cited by the Examiner

UNITED STATES PATENTS

| | | | |
|---|---|---|---|
| 1,196,382 | 8/1916 | Moore | 60—29 |
| 1,895,538 | 1/1933 | Buchi | 60—13 |
| 2,318,914 | 5/1943 | Anderson et al. | 123—30.2 |
| 2,644,436 | 7/1953 | Berlyn | 123—90 |
| 2,647,500 | 8/1953 | Lang | 123—90 |
| 3,125,075 | 3/1964 | Wittek | 123—30.2 |
| 3,146,764 | 9/1964 | Elsbett | 123—52 |

FOREIGN PATENTS 527,059  10/1940  Great Britain.

OTHER REFERENCES

Smith, Philip H.: Exhaust and Intake Systems, The Whitefriars Press Ltd., London and Tonbridge, first impression 1962, reprinted January 1963, December 1963, pp. 18, 146.

MARK NEWMAN, *Primary Examiner.*

WENDELL E. BURNS, *Examiner.*